United States Patent [19]

Powell et al.

[11] Patent Number: 4,558,746
[45] Date of Patent: Dec. 17, 1985

[54] LAWN WORKING IMPLEMENT

[76] Inventors: John J. Powell, 6991 Power St., Riverdale, Ga. 30274; Herbert L. Powell, 9192 Fayetteville Rd., Jonesboro, both of Ga. 30236

[21] Appl. No.: 570,522

[22] Filed: Jan. 13, 1984

[51] Int. Cl.⁴ ............................................. A01B 45/00
[52] U.S. Cl. ..................... 172/421; 56/396; 56/400; 172/611; 172/661; 172/688; 172/744; 280/408
[58] Field of Search ............... 172/21, 198, 372, 373, 172/378, 379, 421, 611, 669, 688, 697, 687, 689, 690, 691, 694, 744, 766, 661; 37/2 R; 171/19, 105; 56/396, 397, 400

[56] References Cited

U.S. PATENT DOCUMENTS

| | | | |
|---|---|---|---|
| 4,459 | 4/1846 | Ide | 172/669 |
| 198,129 | 12/1877 | Lees | 172/198 X |
| 590,274 | 9/1897 | Parks et al. | 172/198 |
| 804,300 | 11/1905 | Blinde | 172/611 |
| 879,291 | 2/1908 | Meinen | 172/372 |
| 1,272,294 | 7/1918 | Mize | 172/669 |
| 1,319,951 | 10/1919 | Erter | 172/688 X |
| 2,029,250 | 1/1936 | Noell et al. | 172/669 |
| 2,246,946 | 6/1941 | Lupo | 172/688 |
| 2,382,689 | 8/1945 | Yates et al. | 172/611 X |
| 2,727,346 | 12/1955 | Witwer | 172/669 |
| 2,731,896 | 1/1956 | Wurster | 172/448 |
| 2,843,032 | 7/1958 | Jones | 172/611 |
| 2,910,128 | 10/1959 | Giles | 172/611 X |
| 2,953,210 | 9/1960 | Bauserman | 172/354 |
| 3,135,339 | 6/1964 | Fry et al. | 172/688 X |
| 4,091,879 | 5/1978 | Lomberk et al. | 172/373 |
| 4,308,920 | 1/1982 | Floyd et al. | 172/328 |
| 4,472,930 | 9/1984 | Smith | 56/396 |

FOREIGN PATENT DOCUMENTS

| | | | |
|---|---|---|---|
| 1008719 | 4/1977 | Canada | 172/766 |
| 323852 | 10/1957 | Switzerland | 172/691 |
| 633784 | 12/1949 | United Kingdom | 172/421 |

Primary Examiner—Richard T. Stouffer
Attorney, Agent, or Firm—Kilpatrick & Cody

[57] ABSTRACT

A lawn working implement having rigid teeth which is towed behind a small tractor or other such apparatus to thatch, sow or work a lawn. The implement is compact and highly maneuverable, yet applies pressure to its rigid tines to work the lawn effectively and efficiently. Swivel mounted wheels allow the implement to follow the tractor directly in its path so that confined areas of yards may be reached. The height of the tines above ground may be adjusted by varying the setting at which the wheels are attached to the frame, and their pressure against the ground may be adjusted by adding bricks, cement or other heavy material to a cavity in the implement. The implement has a hitch for attaching a sweeper or lawn vacuum to be towed behind it.

7 Claims, 5 Drawing Figures

4,558,746

LAWN WORKING IMPLEMENT

BACKGROUND OF THE INVENTION

This invention relates to an implement having rigid teeth which is towed behind a small tractor or other means to thatch, sow or work a lawn. The implement is compact and highly maneuverable, yet applies needed pressure to its rigid tines to work the lawn effectively and efficiently.

Previous towed ground working implements have typically been designed for working large areas. Such implements include that disclosed in U.S. Pat. No. 4,308,920 issued Jan. 5, 1982, to Floyd, et al. The Floyd, et al. implement, which is towed behind a tractor, has a frame with rigid teeth depending from it, and rigidly mounted wheels. A relatively long tongue connects the implement to a tractor.

The implement disclosed in U.S. Pat. No. 2,731,896 issued Jan. 24, 1956 to Wurster comprises a light weight frame with many knife-like tines depending from it. That implement has no wheels and is connected to the rear of a tractor by an upper adjustable link and two lower hydraulically operated links. Instead of trailing in the path of the tractor, it actually acts as a rear appendage of the tractor to till and work the ground. Because the links connecting the implement to the tractor are relatively long, the implement may present difficulties in working ground in confined areas such as yards or on lawns.

U.S. Pat. No. 1,272,294 issued July 9, 1918 to Mize discloses a harrow having several rows of rigid teeth depending from it. The harrow is supported by three wheels, the front two of which are rigidly mounted so as to be adjustable in height. The harrow has a seat for an operator and is drawn by a horse or a team of horses. It is connected to the horses by a relatively long tongue and a draft-line.

U.S. Pat. No. 2,246,946 issued June 24, 1941 to Lupo discloses a smaller implement than those mentioned above, which may be used for working smaller areas. It has rigidly mounted wheels, however, which inhibit easy turning and maneuvering in small areas. A relatively long tongue is used to connect this implement to its motive means.

U.S. Pat. No. 4,091,879 issued May 30, 1978 to Lomberk, et. al. and U.S. Pat. No. 2,953,210 issued Sept. 20, 1960 to Bauserman disclose hand-operated garden or lawn working tools having rigid tines. These, of course, are highly maneuverable, but are difficult to connect to a tractor for sustained mechanical power.

SUMMARY OF THE INVENTION

The implement of the present invention has a compact frame with a short tongue to connect it to the lawn tractor or mower behind which it is towed. Swivel-mounted wheels allow the implement to follow the tractor directly in its path so that confined areas of yards may be reached, such as odd-shaped areas around shrubbery and areas around curbs, houses and trees. Despite its small size, the rigid teeth of this implement allow it to dig and pull vigorously at the lawn surface to loosen dead grass clippings and other material. The implement has a cavity for carrying bricks, cement or other heavy ballast material, so that this digging and pulling action of the teeth may be adjustably varied. The wheels are mounted so that the height of the tines above the ground may be varied, for the same purpose. To remove material loosened by the tines, the implement has a hitch for towing a vacuum or sweeper behind it.

It is therefore an object of this invention to provide a lawn working implement that may be used to thatch, sow or otherwise work lawns, yards or confined areas.

It is another object of this invention to provide a lawn working implement that is easily maneuverable and that follows directly in the path of its tractor or motive means.

It is a further object of this invention to provide a lawn working implement having rigid tines that dig and pull vigorously at the lawn surface being worked.

It is further object of this invention to provide a lawn working implement in which the pressure exerted by the tines against the lawn surface, as well as the height of the tines above the lawn surface, may be varied or adjusted.

It is still another object of this invention to provide a lawn working implement having a short tongue connecting it to its tractor or motive means so that it may easily be moved in forward or in reverse.

Other objects, features and advantages of this invention will become apparent in light of the description and claims below.

DETAILED DESCRIPTION OF THE DRAWINGS

Figure 1:
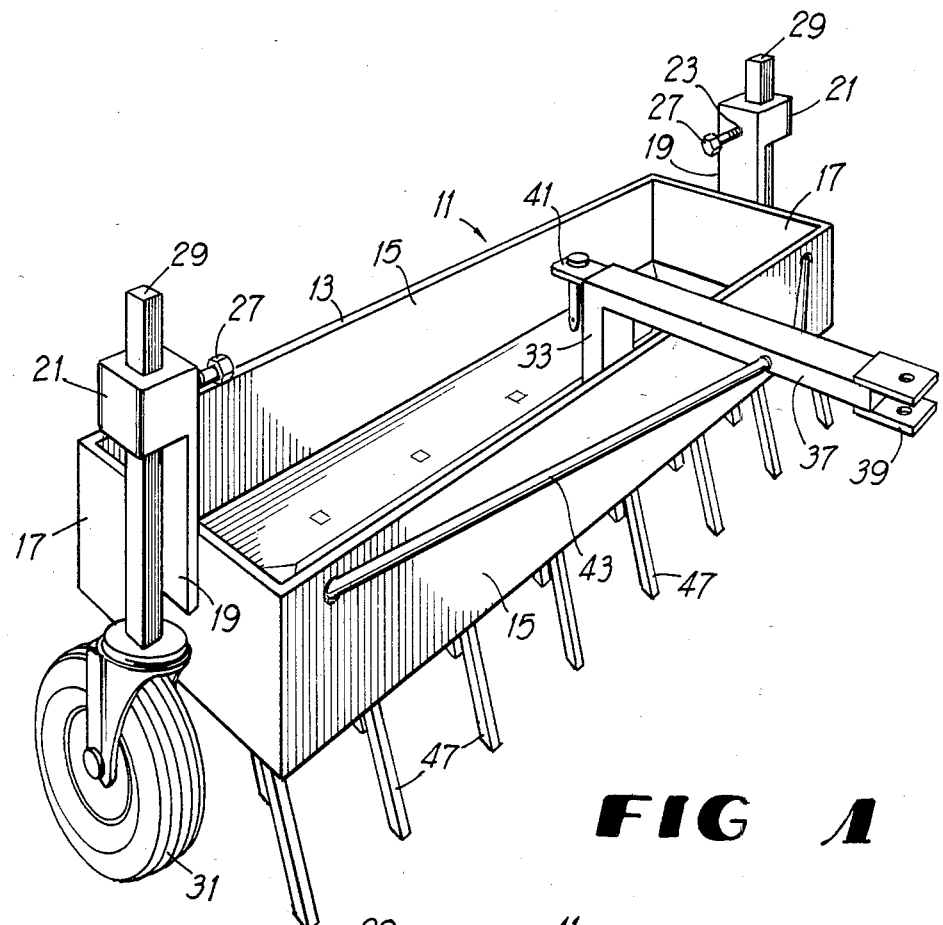
FIG. 1 is a perspective view of one embodiment of the lawn working implement of this invention.
Figure 2:
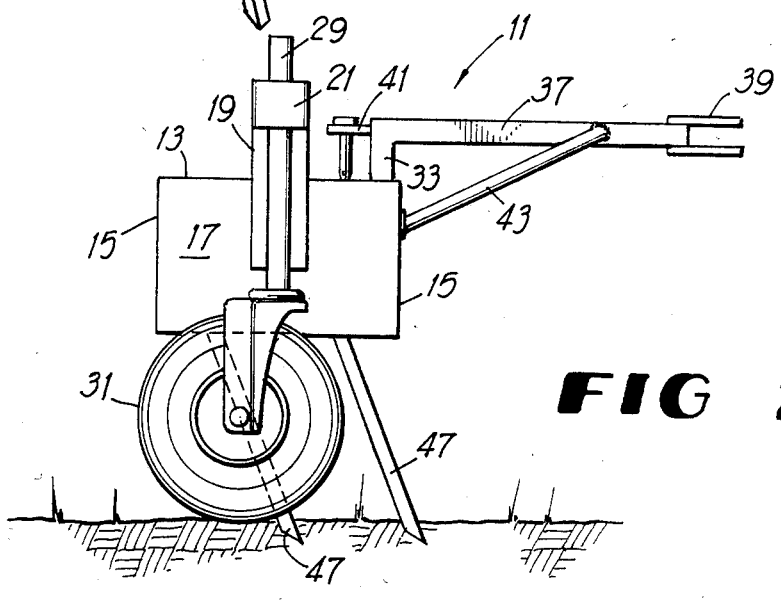
FIG. 2 is a side elevational view of the lawn working implement of FIG. 1.
Figure 3:
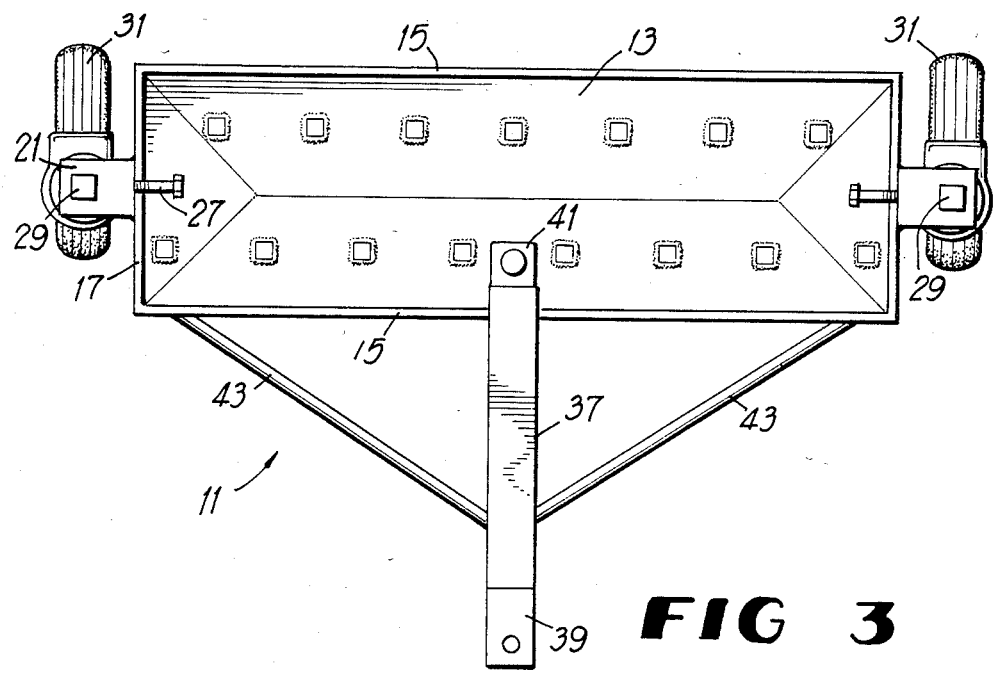
FIG. 3 is plan view of the lawn working implement of FIG. 1.

FIGS. 1, 2 and 3 show one embodiment of the lawn working implement 11 of this invention. Frame 13 comprises two transverse members 15 and two longitudinal members 17. In the preferred embodiment, transverse members 15 are pieces of $\frac{1}{4}''\times 3''\times 28''$ (6 mm×76 mm×71 cm) angle iron whose ends are mitered at a horizontal angle of 45 degrees, and longitudinal members 17 are each pieces of $\frac{1}{4}''\times 3''\times 6''$ (6 mm×76 mm×152 mm) angle iron whose ends are also mitered at a horizontal angle of 45 degrees. The ends of these members are welded together in the preferred embodiment, but may be attached by any other suitable method such as nuts and bolts. Transverse members 15 and longitudinal members 17 are assembled so that they form a cavity in the upper surface of frame 13 to receive bricks, concrete, dirt or other material for adjusting the weight of implement 11 and therefore for adjusting the force with which its tines are applied against the lawn surface. Transverse members 15 and longitudinal members 17 may, of course, be formed of other materials, such as extruded aluminum or alloys.

Wheels are adjustably connected to the side portions of frame 13. In the preferred embodiment, wheel brackets 19 of $\frac{3}{8}''\times 2''\times 4''$ (10 mm×51 mm×102 mm) flat iron are welded to the outer surfaces of longitudinal members 17. To the upper and outer portion of each wheel bracket is welded a strut mount 21. Strut mounts 21 are 2 inch sections of 2 inch (51 mm) square tubing, oriented so that the axis of the tubing is parallel with the vertical axis of frame 13. Each strut mount 21 has a threaded hole 23 for receiving a set screw 27. In the preferred embodiment, set screws 27 are 9/16 inch lock or jam bolts having a ½ inch shank and 2½ inch length.

Each strut mount 21 of the preferred embodiment receives a strut 29 attached to a wheel 31. The struts 29 of the preferred embodiment are ½ inch (13 mm) square rod 7 inches in length, but their length and thickness may be varied to accommodate the configuration of wheel brackets 19 and strut mounts 21. Wheels 31 are connected to the bottom portions of struts 29, as by welding or other means. Wheels 31 in the preferred embodiment are 4 inch casters, but they may be any other type of wheel mounted so that they may swivel with respect to frame 13.

A tongue 37 is connected to the forward portion of frame 13 for towing implement 11. In the preferred embodiment, a tongue mount 33 comprising a piece of 3/16"×3"×7" (5 mm×76 mm×178 mm) channel iron is welded to the center of the forward transverse member 15 in an upright orientation. Tongue 37 is welded to the upper portion of tongue mount 33, so that it extends forward and rearward from tongue mount 33. In the preferred embodiment, tongue 37 is a piece of 3/16"×2"×17½" (5 mm×51 mm×191 mm) channel iron welded horizontally to tongue mount 3. In the preferred embodiment, a forward hitch 39 and an after hitch 41 are mounted on the forward and rearward portions of tongue 37, respectively. Forward hitch 39 in the preferred embodiment comprises two pieces of 3/16"×1½"×3¾" (5 mm×38 mm×95 mm) flat iron having a ½ inch hole drilled therethrough. After hitch 41 comprises one piece of 3/16"×1½"×3¾" (5 mm×38 mm×95 mm) flat iron having a ½ inch hole drilled therethrough. Forward hitch 39 is used to connect implement 11 to a tractor or other motive means, and after hitch 41 is used to attach a sweeper or vacuum to the implement. In the preferred embodiment, stabilizer rods 43 attached to the forward transverse member 15 and to the side portions of tongue 37 stabilize tongue 37 laterally. These rods in the preferred embodiment are ½ inch (13 mm) in diameter and 15 inches long, and are welded to forward transverse number 15 and tongue 37.

Tines 47 extend from the lower surface of frame 13 of the implement in the present invention. In the preferred embodiment, tines 47 are 4 inch long ⅜ inch square (102 mm×10 mm) steel rods welded to the lower surface of frame 13 so that they are in two staggered rows and spaced three inches apart from one another. The rows in the preferred embodiment are spaced 3½ inches (89 mm) apart, but any suitable spacing may be used.

Figures 4, 5:
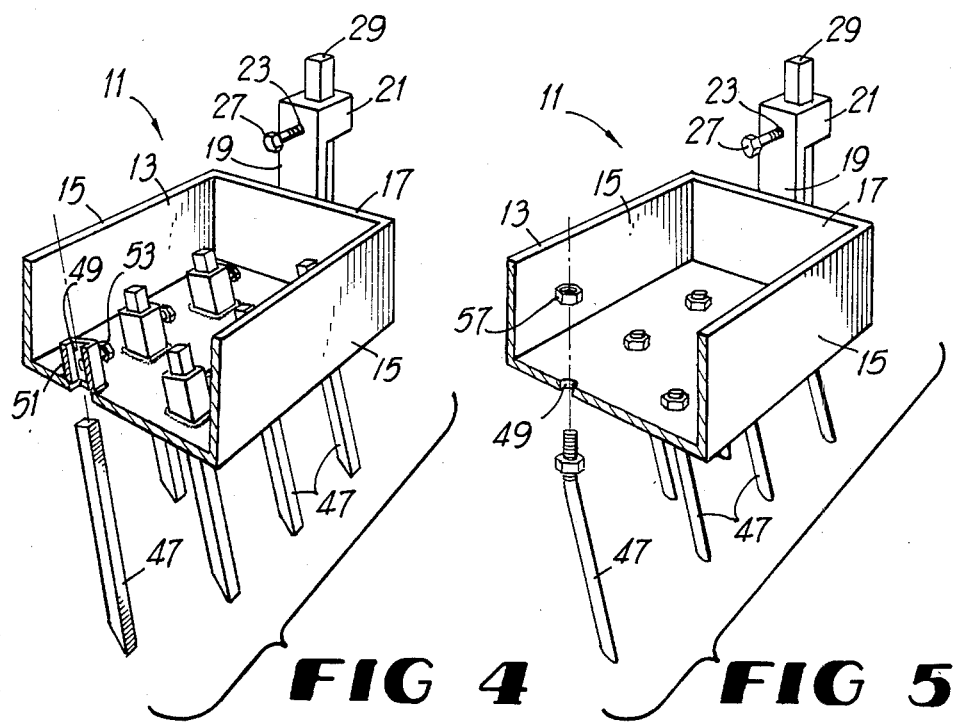
FIG. 4 is a perspective view of a second embodiment of the lawn working implement of this invention, in which collars with set screws hold its tines in place.
FIG. 5 is a perspective view of a third embodiment of the lawn working implement of this invention, in which the tines have threaded upper portions and are held in place by jam nuts.

As illustrated in FIG. 4, tines 47 may also be mounted to frame 13 by inserting them into tine openings 49 formed in frame 13 and locking them in collars 51 mounted to frame 13 above or below tine openings 49. Collars 51 have set screws 53 threadably inserted therethrough for holding tines 47 in place. Collars 51 may be sections of appropriate tubing, such as ½ inch or ⅜ inch inside diameter tubing. Alternatively, tine openings 49 may be threaded openings to receive threaded tines 47 held in place by jam nuts 57 as shown in FIG. 5.

Tines 47 may be mounted according to the above mentioned method or any other suitable method, so that they extend in a direction normal to the bottom surface of frame 13. In the preferred embodiment, however, tines 47 extend 10 degrees forward of normal, so that the angle defined by their front surface and the bottom surface of frame 13 forward of them is between 75 and 85 degrees, and preferably 80 degrees. This orientation of tines 47 allows them to act as hooks in conjunction with tongue 37 and frame 13, as may be visualized by reference to FIG. 2. The resulting hooking action serves to prevent implement 11 from riding on the ends of tines 47, and causes more effective gouging or working of the ground surface.

Tines 47 have flat bottom surfaces in the preferred embodiment. These surfaces are not perpendicular to the longitudinal axes of tines 47 in the preferred embodiment, but define an angle of between 65 and 75 degrees with the front surface of tines 47 and between 105 degrees and 115 degrees with the rear surface of tines 47. Where tines 47 are mounted for removal as with collars 51 or jam nuts 57 mentioned above, they may be removed and sharpened. Particularly appropriate with such an embodiment is a tine 47 having a pointed end better to engage the lawn being worked. Of course, any other suitable end shape may be used.

The foregoing description of the present invention is for purposes of explanation and illustration. It will be apparent to those skilled in the relevant art that modifications and changes may be made to the invention as thus described without departing from its scope and spirit.

I claim:

1. An implement for working a lawn, comprising:
   (a) a frame comprising two transverse angle iron members welded to two longitudinal angle iron members to form a cavity in its upper surface to receive ballast for varying the weight of the implement and the pressure exerted on the ground being worked;
   (b) two wheel brackets made of flat iron, each welded to a side portion of the frame;
   (c) two strut mounts of square tubing, each welded to the upper portion of a wheel bracket, and each having a set screw placed in a threaded orifice in the mount;
   (d) two struts made of steel rod, each held in place in one of the strut mounts by one of the set screws;
   (e) two casters, each connected to the bottom portion of one of the struts;
   (f) a forward and an after row of tines connected to the lower portion of the frame so that the angle defined by the forward surface of each tine and the bottom surface of the frame forward of the tine is between 75 degrees and 85 degrees;
   (g) a tongue mount of channel iron welded to the forward portion of the frame;
   (h) a tongue of channel iron welded to the upper portion of the tongue mount, for connecting the implement to a motive means; and
   (i) an after hitch welded to the rear portion of the tongue comprising a flat iron piece having a hole drilled therethrough, for towing a vacuum, sweeping or other apparatus behind the implement.

2. An implement according to claim 1 wherein said tines are made of steel and are welded to the bottom surface of said frame.

3. An implement according to claim 1 further comprising:

(a) a plurality of openings formed in the bottom surface of said frame, each for receiving one of said tines; and (b) a plurality of collars, comprising steel tubing sections, welded to said frame, each coaxially with one of the openings, and each having a set screw placed in a threaded orifice therein for holding one of the tines in place.

4. An implement according to claim 1 wherein each of said tines is a steel rod having a conical point.

5. An implement according to claim 1 wherein each of said tines has a flat bottom surface inclined at an angle between 65 degrees and 75 degrees to the longitudinal axis of the tine.

6. An implement according to claim 1 wherein a plurality of threaded openings are formed in the bottom surface of said frame, and wherein the upper portion of each of said tines is threaded to be threadably received in one of the openings.

7. A lawn working implement according to claim 6 further comprising a plurality of jam nuts, each to hold one of said tines in place.

* * * * *